(12) United States Patent
Heinz-Nötzel et al.

(10) Patent No.: US 10,799,933 B2
(45) Date of Patent: Oct. 13, 2020

(54) METHODS AND PUNCH HANDLING APPARATUSES FOR THE PRODUCTION OF A WORKPIECE

(71) Applicant: TRUMPF Werkzeugmaschinen GmbH + Co. KG, Ditzingen (DE)

(72) Inventors: Alexander Heinz-Nötzel, Amsterdam (NL); Jens Kappes, Schaumburg (IL)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 0 days.

(21) Appl. No.: 16/716,594

(22) Filed: Dec. 17, 2019

(65) Prior Publication Data

US 2020/0122217 A1  Apr. 23, 2020

Related U.S. Application Data

(63) Continuation of application No. 15/715,821, filed on Sep. 26, 2017, now Pat. No. 10,512,963.

(30) Foreign Application Priority Data

Sep. 26, 2016 (EP) .................................... 16190654

(51) Int. Cl.
*B21D 39/03* (2006.01)
*B21D 28/26* (2006.01)
*B21D 28/10* (2006.01)
*B21D 28/02* (2006.01)
(Continued)

(52) U.S. Cl.
CPC ........... *B21D 39/032* (2013.01); *B21D 28/02* (2013.01); *B21D 28/10* (2013.01); *B21D 28/26* (2013.01); *B21D 39/03* (2013.01); *B23P 11/005* (2013.01); *F16B 17/00* (2013.01)

(58) Field of Classification Search
CPC ...... B21D 39/032; B21D 28/02; B21D 39/03; B21D 28/10; B21D 28/26; B23P 11/005; F16B 17/00
See application file for complete search history.

(56) References Cited

U.S. PATENT DOCUMENTS

| 5,884,386 | A | 3/1999 | Blacket et al. |
| 9,849,546 | B2 | 12/2017 | Krastev et al. |
| 2008/0016935 | A1 | 1/2008 | Rotter et al. |

(Continued)

FOREIGN PATENT DOCUMENTS

| DE | 19524235 | 1/1997 |
| DE | 19927101 | 12/2000 |

(Continued)

*Primary Examiner* — Bayan Salone
(74) *Attorney, Agent, or Firm* — Fish & Richardson P.C.

(57) ABSTRACT

This disclosure relates to methods and apparatuses for production of a workpiece. A first workpiece part is cut free from a first plate-shaped material by a separating cut made via the punch-handling tool. The first workpiece part is held in at least one of a clamped manner and tensioned manner via at least one of an upper tool and a lower tool of a punch-handling tool while being cut free. The workpiece part is aligned with the first plate-shaped material, a further plate-shaped material that differs from a material of the first workpiece part, and a second workpiece part and the aligned pieces are clinching with a clinch tool to connect the pieces at a connection point that is free from a filler material.

7 Claims, 5 Drawing Sheets

(51) Int. Cl.
*B23P 11/00* (2006.01)
*F16B 17/00* (2006.01)

(56) References Cited

U.S. PATENT DOCUMENTS

2013/0284295 A1* 10/2013 Krastev ................ F15B 13/081
  137/884
2018/0085814 A1   3/2018 Heinz et al.

FOREIGN PATENT DOCUMENTS

| DE | 102010020540 | | 12/2010 | | |
| DE | 102010020540 | A1 * | 12/2010 | ........... | B21D 39/034 |
| EP | 2184118 | | 5/2010 | | |
| EP | 2184118 | A1 * | 5/2010 | ............. | B21D 28/12 |

* cited by examiner

METHODS AND PUNCH HANDLING APPARATUSES FOR THE PRODUCTION OF A WORKPIECE

CROSS-REFERENCE TO RELATED APPLICATION

This application is a continuation of and claims priority to U.S. application Ser. No. 15/715,821, filed on Sep. 26, 2017, which claims priority to European Application No. 16190654.0, filed on Sep. 26, 2016. The contents of the priority applications are hereby incorporated by reference in their entirety.

TECHNICAL FIELD

The invention relates to methods for the production of a workpiece, in particular a strengthened workpiece, and a punch-handling tool for carrying out the methods.

BACKGROUND

DE 195 24 235 A1 discloses a method for the production of a molded part having different material thicknesses is known. DE 195 24 235 A1 provides that a base board is initially cut to an intermediary or finished measurement. Subsequently, a strengthening element is cut and connected on the base board by means of a joining technique, such as adhesion, welding or soldering, as well as clinching, for example. Subsequently, further punching and forming steps are carried out on the base board to produce the molded part.

SUMMARY

The present disclosure relates to methods for the production of a particularly strengthened workpiece with increased process safety and an improved position accuracy of workpieces to be connected. The present disclosure also relates to punch-handling tools for carrying out such methods.

In one aspect, the present disclosure provides methods in which the first workpiece part is cut free from a first plate-shaped material by means of a separating cut by a punch-handling tool that has an upper tool having at least one punching stamp and a lower tool having at least one punching die, and, when cutting free, the first workpiece part is held in a clamped or tensioned manner by the upper tool or the lower tool, and a clinch tool is allocated to the upper or lower tool that receives the first workpiece part, and the plate-shaped material or a different plate-shaped material or a second workpiece part, which is produced from one of the plate-shaped materials, is positioned to lie between the upper and lower tool, and the first workpiece part and the plate-shaped material or the second workpiece part are aligned relative to each other, and in which the clinch tool and the upper or lower tool that receives the first workpiece part are guided together and at least one connection point that is free from filler material is introduced into the plate-shaped material and the first workpiece part or into the first and second workpiece part.

As a result of such a sequence of work steps, it is possible that, after cutting the first workpiece part free from the plate-shaped material, a position-accurate reception of the first workpiece part takes place by means of the upper tool or lower tool, and this position-accurate reception can be maintained during positioning relative to the clinch tool, in particular a clinching die. Furthermore, a shortening of the processing time is also obtained by maintaining the tension of the first workpiece part on the punch-handling tool. In addition, the process safety can also be increased as a result of the reception of the workpiece part when cutting free by the upper tool or lower tool and the subsequent direct transfer for connecting to the tool without using filler materials, since no handling steps are required therebetween for the first workpiece part.

In certain implementations of this method, the first workpiece part has a flat extension that is smaller than an external periphery or a base surface of a punching stamp of the upper tool or a punching die of the lower tool.

In another aspect, the present disclosure provides methods in which the first workpiece part is cut free from a first plate-shaped material by a separating cut by means of a punch-handling tool, which has an upper tool having at least one punching stamp and at least one clinch tool and lower tool, and, when cutting the first workpiece part free, it is held on the upper tool in a clamped or tensioned manner by means of the at least one punching stamp, and in which the first workpiece part is aligned and positioned relative to the plate-shaped material or relative to a different material or a second workpiece part, that is produced from one of the plate-shaped materials, and in which the punching stamp is inactivated on the upper tool after positioning the first workpiece part relative to the plate-shaped material and a clinch tool provided on the upper tool is activated and the clinch tool on the upper tool interacts with a clinch die and at least one connection point that is free from filler material is introduced in the first and second workpiece part.

In these embodiments, it is alternatively provided that the punch-handling tool includes an upper tool on which both at least one punching stamp and a clinch tool is present such that the first workpiece part is held on the punching stamp in a clamped or tensioned manner and is transported to the second workpiece tool. As a result of this control or activation and inactivation of the punching stamp and the clinch tool, cutting free, transporting and connecting can be carried out successively by means of an upper tool. With an inactivation of the punching stamp or the clinch tool, the inactive punching stamp or the inactive clinch tool can be retracted in a tool base body of the upper tool. With an activation, the punching stamp or the clinch tool is held in a stationary position relative to the tool base body. The lower tool includes at least a punching die and at least one clinch die. These methods are provided in particular with larger components in which the surface dimensions are larger than the external periphery or the surface area of a punching stamp of the upper tool.

In certain implementations, the at least one first workpiece part and the plate-shaped material or the first and the second workpiece part are connected by means of a join that is free from filler material, in particular by clinching. With such a join, in particular clinching, the additional part that is formed as a sheet part and the plate-shaped material are connected to each other without using a filler material by means of a forming method, wherein, in such a forming method, forming regions are created with undercuts to allow a permanent and stable connection.

In particular implementations, the at least one first workpiece part and the second workpiece part are produced from the same or different plate-shaped material. Thus, for example when clamping a plate-shaped material in a punching machine, initially, the workpiece part is produced in the contour and is then removed from the plate-shaped material by the separating cut to then apply this to the second workpiece part that is still to be processed or at least partially processed and is made of the same plate-shaped material. In a subsequent processing step, the second workpiece part can then also already be finally processed in terms of the contour and cut free for forming the strengthened workpiece. Alternatively, the second workpiece part can also already be processed in the contour such that only one rod connector still holds the second workpiece part relative to the plate-shaped material that is detached after the production of the connection points relative to at least one first workpiece part.

In some implementations, the first workpiece part is held in a receiver on the punching stamp and the punching die in a clamped or tensioned manner. This receiver is formed as an indent, in accordance with particular implementations. The edges of the indent can be formed to be sloped such that the receiver opening has a larger surface than the receiver base. As a result, a frictional positioning of the first workpiece part in the receiver can take place.

In certain implementations, the second workpiece part is produced by means of punching and/or bending and/or laser processing and consists of a different material from the first workpiece part and is supplied with the first workpiece part before connecting. Thus, strengthened workpieces can also be produced in which the material and/or the wall thickness of the at least one first workpiece part or the processed workpiece deviate from each other.

In particular implementations, at least one connection point is introduced as a pre-fixing between the at least one first workpiece part and the plate-shaped material and, at the end of the processing of the strengthened workpiece, the at least one connection point introduced as a pre-fixing is punched out or detached. As a result, a further increase of position accuracy can be achieved since at least one connection point is immediately introduced when supplying and positioning the first workpiece part to the workpiece to allow the pre-fixing, independently of whether this connection point is needed at that point.

In particular implementations, two or more first and/or second workpiece parts are positioned to be lying one on top of the other and are connected to one another by means of at least one connection point that is free from filler material to form a sandwich component. As a result, multi-layer plates having stiffening ribs lying therebetween can be produced.

In another aspect, the present disclosure provides punch-handling tools for producing workpieces, in particular a workpiece strengthened by a first workpiece part, said workpiece having an upper tool having at least one punching stamp and a lower tool having at least one punching die, wherein the punching stamp or the stamping die holds the first workpiece part in a clamped or tensioned manner by means of the punching stamp or the punching die after the final separating cut to cut a first workpiece part free from a plate-shaped material. The punching die or the punching stamp is thus provided to be free from a scraper. In particular, a contour of the punching stamp or the punching die is chosen such that the clamping or tensioning between the first workpiece part and the punching stamp or the punching die is established after cutting the first component free such that, subsequently, a safer transportation of the first workpiece part by means of the punching stamp or the punching die is possible.

In particular implementations, the punching stamp or the punching die holds the first workpiece part by at least partially surrounding an external contour of the first workpiece part or by engaging in an internal contour of the first workpiece part. For example, with small workpiece parts that are smaller than the base surface of the punching stamp or the punching die or a tool base body of the upper tool or lower tool, the punching stamp or the punching die can have a receiver or an indent, the external contour of which is slightly smaller than the external contour of the first workpiece part or the side walls of which are inclined towards the indent such that the first workpiece part is received in the indent in a tensioned manner. With components of a flat dimension that extend beyond the punching stamp or the punching die or have external contours that are difficult to grip or cannot receive such a clamping receiver via the external contour of the workpiece, at least one punching stamp is provided that abuts on an internal contour, such as a round or polygonal recess, for example, to receive the first workpiece part by clamping or wedging. To do so, it can be provided that the punching stamp(s) has a slope on a peripheral wall, starting from the stamping surface to the tool body, said peripheral wall can taper with respect to the stamping surface or being inclined inwards. As a result, the workpiece can be held in a clamped manner after punching. In particular, the workpiece can be slightly inclined or tilted when being raised from the plate-shaped material or remaining grid, whereby clamping or wedging is supported. In particular implementations, an adjacent tool, in particular a clinch tool, is formed on the tool base body to be shorter in length than the punching stamp(s).

Furthermore, it is provided according to particular embodiments that the upper tool has a punching stamp having a receiver for the first workpiece part, and the punching die of the lower tool comprises a pressure surface to transfer the first workpiece part into the receiver in the punching stamp, and a clinch tool, e.g. a clinching die, which connects the first workpiece part and the second workpiece part to the punching stamp. Thus, a so-called cut-out tool, for example, having two dies is provided, said dies forming the punch-handling tool. The present description also applies in an opposite manner in that the receiver is provided in the punching die and has the pressure surface in the punching stamp and interacts with the tensioning die by means of a clinch tool. This embodiment of the punch-handling tool is provided in particular for small components in which a receiver or an indent can be introduced in the tool base body.

In particular implementations, the upper tool has at least one punching stamp and at least one clinch tool in a tool base body that are moveably received in a guide body relative the tool base body and the at least one punching stamp is activated for introducing the separating cut such that the punching stamp is held in such a way that it cannot be moved relative to the tool base body during a power stroke, and the clinch tool is inactivated such that the clinch tool can be retracted into the tool base body during a power stroke, and the punching stamp is inactivated for connecting the first workpiece part to the second workpiece part in a manner free from filler material and the clinch tool is activated with respect to the tool base body. Such an upper tool is also called a so-called multi-tool, which can have several tools that can be selectively controlled to be used. In particular implementations, two punching stamps adjacent to each other are formed as punching stamps for introducing the separating cut. Such embodiments have the advantage that large-surface or heavy first workpiece parts, in particular, can be wedged in or tensioned such that there is a secured, frictional reception.

The disclosure and further advantageous embodiments and developments thereof are described and explained in more detail below by means of the examples depicted in the drawings. The features that can be seen in the description

DETAILED DESCRIPTION

Figure 1:
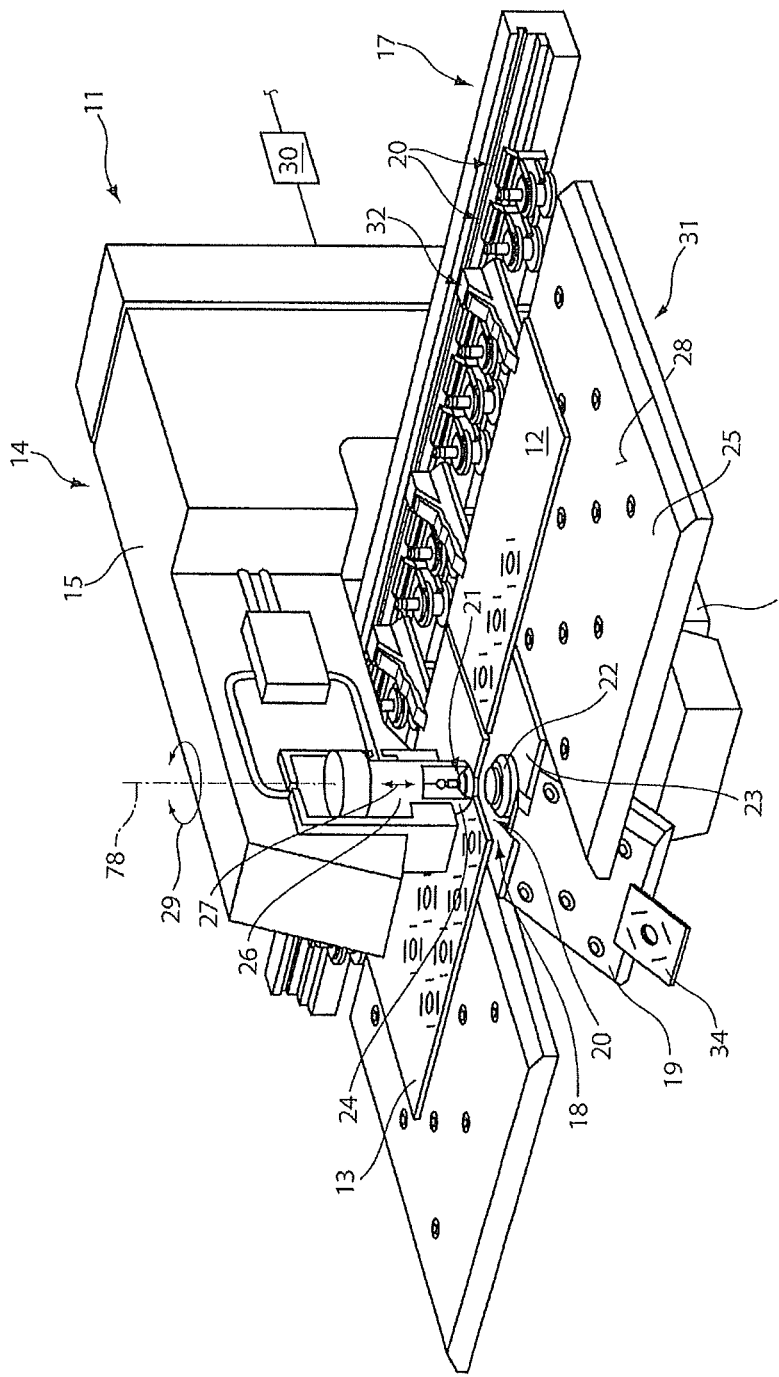
FIG. 1 illustrates a perspective view of a tool machine.

In FIG. 1, a workpiece processing machine 11 for processing plate-shaped materials 12, 13, such as sheets, for example, is depicted in perspective. The processing of such plate-shaped materials, 12, 13 can here comprise punching, bending, signing embossing, engraving, deburring, roll forming, in particular roll pinching, and film separating of a film on the surface of the plate-shaped material. Furthermore, such a workpiece processing machine 11 can additionally allow cutting processing by means of a laser. The workpiece processing machine 11 has a C-shaped base frame 14 having an upper frame leg 15 and a lower frame leg 16. In a throat cavity between the upper frame leg 15 and the lower frame leg 16, a conventional coordinate guide 17 is housed. The coordinate guide 17 serves to position or move the plate-shaped workpieces 12, 13 relative to a processing station 18 of the workpiece processing machine 11 and to store and to change and replace tools 20 in the processing station 18.

A tool 20 is changed in the processing station 18. The tool 20 comprises an upper tool 21 and a lower tool 22. The lower tool 22 is arranged on the machine table 25 in a lower tool receiver 23. The machine table 25 rests on the lower base frame 16 of the machine frame 14 on one side. The upper tool 21 is supported on an upper tool receiver 24 of a tappet 26. This can be moved back and forth hydraulically, for example, on the upper frame leg 15 of the frame 14 in the direction of a double arrow 27. Both the upper tool 21 and the lower tool 22 can be adjusted or obstructed around a stroke axis 78 of the tappet 26 in the direction of a double arrow 29. Corresponding blocking movements are also controlled by means of a schematically depicted control device 30 of the workpiece processing machine 11, much like the other essential machine functions.

In a working region 31 of the processing station 18, which is formed by at least one workpiece surface 28 of the machine table 25, at least one first plate-shaped material 12 is held by a gripping device 32 during the processing by means of the tool 20 and is relatively guided in the processing station 18 in a moveable manner. Furthermore, at least one further or second plate-shaped material 13 can be held in the work region 31 by means of a further gripping device, wherein this gripping device advantageously corresponds to the gripping device 32. In certain implementations, these two gripping devices 32, 32' are controllable independently of each other for moving the first plate-shaped material 12 and second plate-shaped material 13 on the workpiece surface 28. Alternatively, yet further plate-shaped materials can be arranged and received in the work region 31 by means of further gripping devices.

The first plate-shaped material 12 deviates advantageously from the second plate-shaped material 13. This can be in terms of the material thickness, in terms of the material choice and/or in terms of the surface of the plate-shaped material. After producing a strengthened workpiece 34 from the first and at least one further, in particular second plate-shaped material, the embodiments thereof being described in more detail below, this strengthened workpiece 34 is guided out of the processing station 18, for example, by means of lowering a table segment 19 of the machine table 25.

Figure 2:
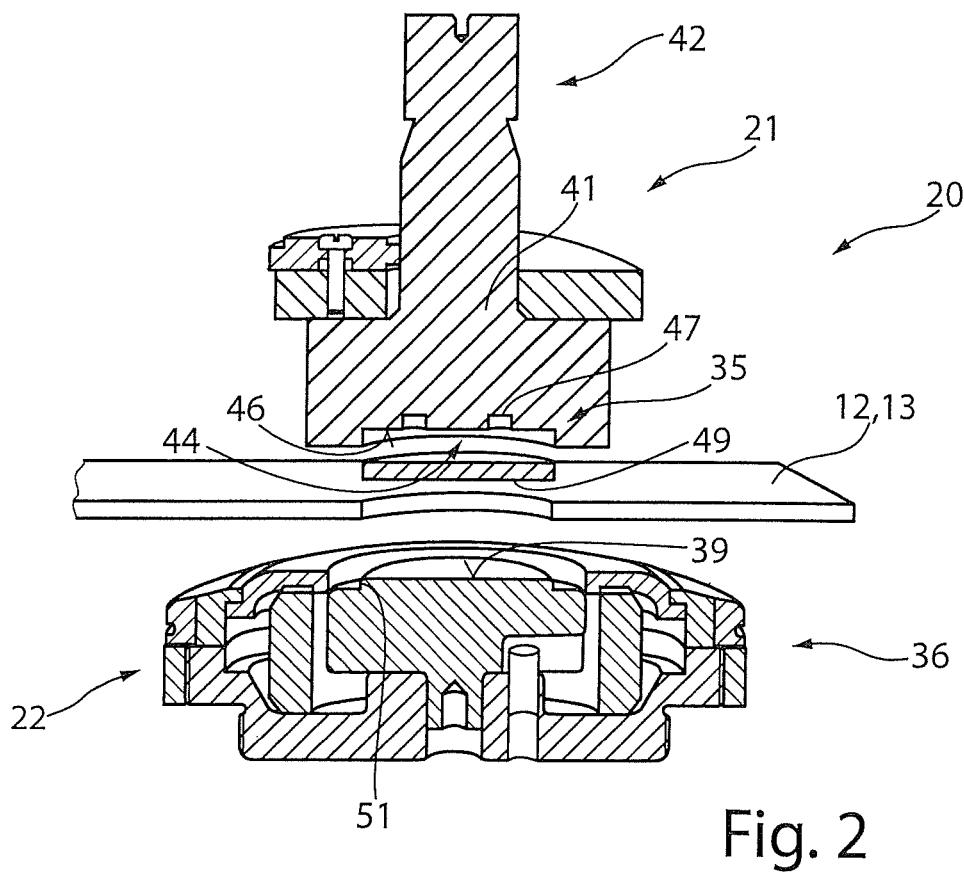
FIG. 2 depicts a schematic sectional view of a first embodiment of a punch-handling tool in a first work step.
Figure 3:
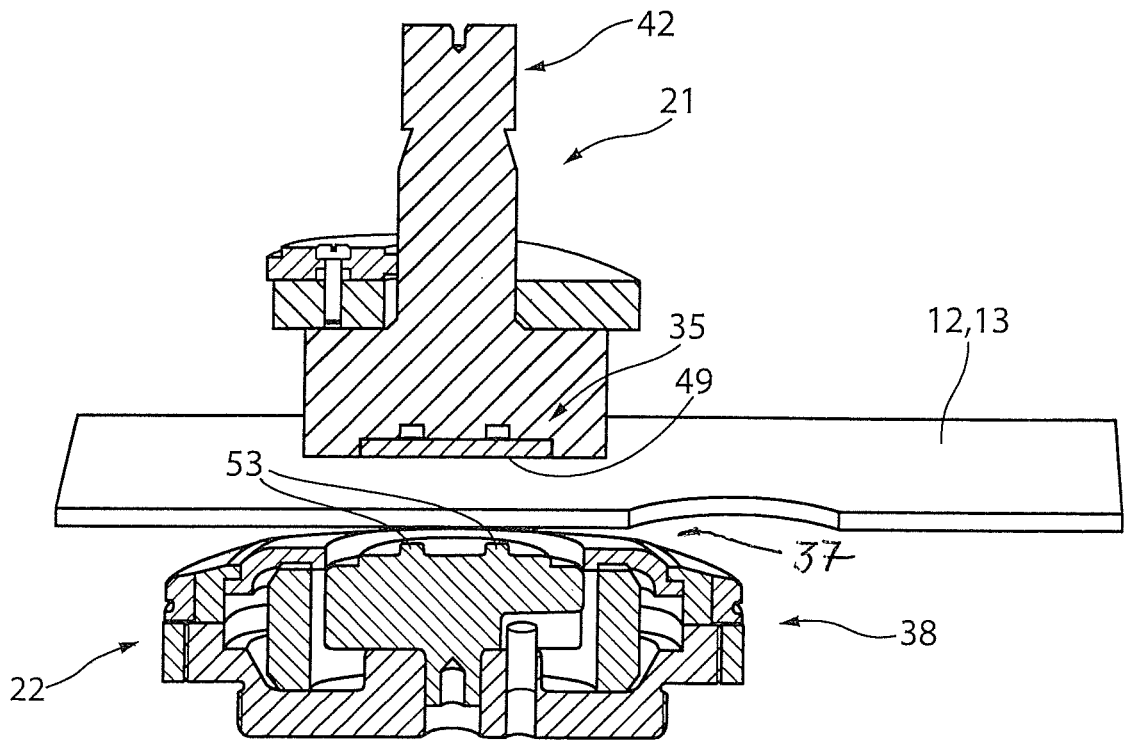
FIG. 3 depicts a schematic sectional view of the punch-handling tool according to FIG. 2 in a second work step.
Figure 4:
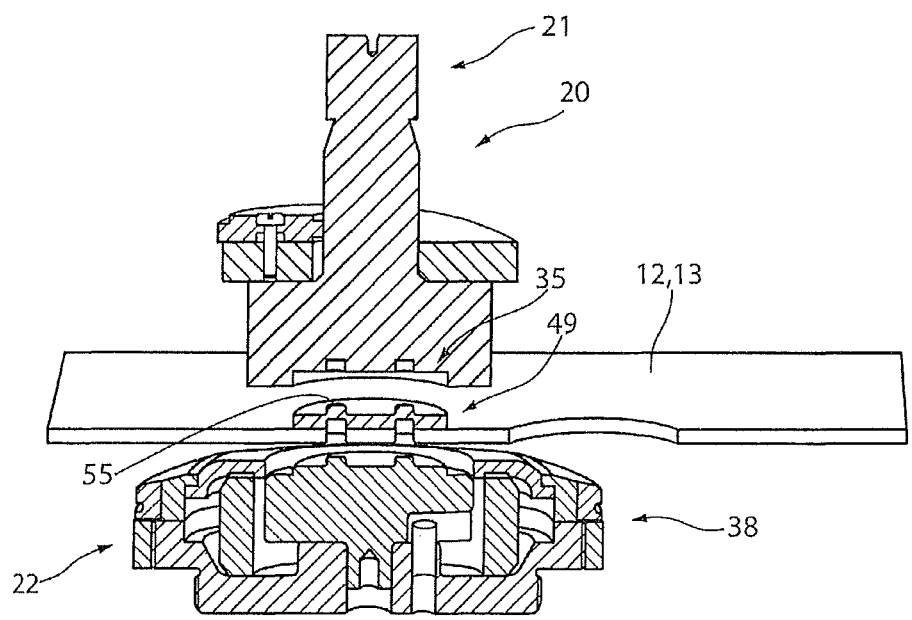
FIG. 4 depicts a schematic sectional view of the punch-handling tool according to FIGS. 2 and 3 in a third work step.

In FIGS. 2 to 4, schematic sectional views are depicted by means of which a strengthened workpiece 34 is produced with a tool 20. This tool 20 is formed as a punch-handling tool that has a cut-out tool as the upper tool 21 and a punching die 36 as the lower tool 22 and a clinch die 38.

The upper tool 21 includes a tool base body 41 on which a chucking pin 42 is provided by means of which the upper tool 21 can be chucked in the upper tool receiver 24. A punching stamp 35 is provided on the tool base body 41, which punching stamp 35 comprises a receiver 44 or indent 44. This receiver 44 is provided on the end side relative to the punching die 36 on the punching stamp 35. Further indents 47 are introduced in a contact surface 46 of the receiver 44, said indents 47 being formed as so-called clinch inserts.

The receiver 44 is adjusted, for example, to the external contour of a first workpiece part 49 to be produced. In exemplary embodiments, the first workpiece part 49 is formed as a pane. The receiver 44 thus has a pane or pot-shaped recess.

Opposite the punching stamp 35, the lower tool 22 having the punching die 36 is formed. This comprises a cutting edge 51 that is adjusted to the receiver 44 in terms of its contour. Furthermore, a pressure surface 39 is formed within the cutting edge 51, by means of which pressure surface 39 the first workpiece part 49 is transferred into the receiver 44.

In this punch-handling tool 20, the first workpiece part 29 is punched out of the plate-shaped material 12 after carrying out a stroke and is transferred into the receiver 44 at the same time and clamped therein or received to be held in a tensioned manner. Thus, a temporary fixing of the first workpiece part 49 on the punching stamp 35 is provided.

In the exemplary embodiment depicted in FIG. 2, the first workpiece part 49 is stamped out of the full-surface plate-shaped material 12. Alternatively, the first workpiece part 49 can be already cut out by means of a separate processing procedure in the shape and contour and is held only by means of the connection rods to the plate-shaped material 12. Thus, in the method step according to FIG. 2, it is only necessary to separate the connection rod, wherein, at the same time, the first workpiece part 49 is also chucked in the receiver 44 of the punching stamp 35 by the punching die 36.

The receiver 44 can also be provided on the punching die 36 such that the situation is reversed.

In FIG. 3, the first workpiece part 49 is moved into a predetermined position by means of the upper tool 21 and is aligned relative to the plate-shaped material 12. Here, a change between the punching die 36 and the clinch die 38 for the following connection process takes place. Subsequently, the first workpiece part 49 is connected to the punching stamp 35 of the upper tool 21 and the plate-shaped material 12 is connected to the multi-tool/clinch die 38 arranged to be opposite the upper tool 21. This multi-tool/clinch die 38 has two clinch stamps 53, for example, which can at least partially engage in the clinch inserts or indents 47.

After aligning the upper tool 21 and clinch die 38 relative to each other and also relative to the plate-shaped material 12, the first workpiece part 49 is connected to the plate-shaped material 12 by means of connection points 55 that are free from filler material. These connection points 55 emerge as a result of joining, in particular clinching. These clinching points are depicted in sections in FIG. 4. The first workpiece part 49 is fixed on the plate-shaped material 12. Then, the plate-shaped material 12 can be processed and/or completed in terms of the external contour by means of further processing steps in the tool machine 11 to form the strengthened workpiece 34.

In the production steps depicted in FIGS. 2 to 4 for producing the strengthened workpiece 34, the strengthened workpiece 34 consists of the same material. Initially, the first workpiece part 49 is stamped out of the plate-shaped material 12 and then this first workpiece part 49 is, in turn, positioned relative to the plate-shaped material 12 to permanently connect this first workpiece part 49 to the plate-shaped material 12. Then, the second workpiece part 33 is formed from the plate-shape material 12, in particular the external contour. After stamping out the second workpiece part 33, the strengthened workpiece 34 is produced. Further downstream processing steps can still be carried out on the processed workpiece 34 according to FIG. 5.

Alternatively to these method steps depicted in FIGS. 2 to 4, it can be provided that, after stamping out the first workpiece part 49 from the plate-shaped material 12, a further plate-shaped material 13 is positioned between the upper tool 21 and lower tool 22 such that when subsequently connecting the first workpiece part 49 to the plate-shaped material 13 or the second workpiece part 33 to be formed from this, two different materials and/or wall thicknesses are connected to each other to form the strengthened workpiece 34.

By chucking the first workpiece part 49 in the punching stamp 35, a simplified handling is made possible.

Figure 5:
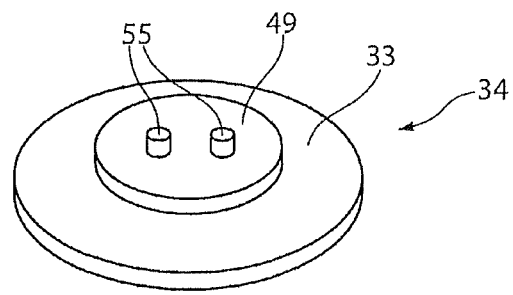
FIG. 5 illustrates a perspective view of a strengthened workpiece.

This method enables the production of the strengthened workpiece 34 according to FIG. 5. In addition, high process security and a shortening of the process time is enabled, since the additional component 49 can be moved and positioned by means of a chucking on the tool 49 for introducing the connection points 55 for producing the strengthened workpiece 34.

Figure 6:
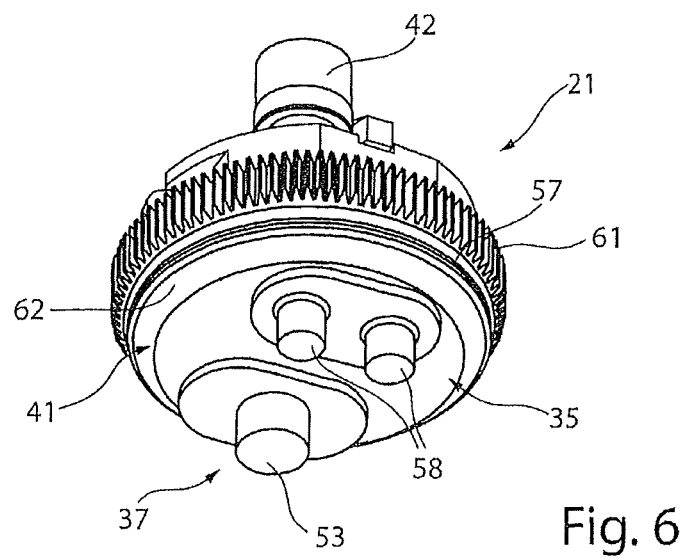
FIG. 6 illustrates a perspective view of an alternative embodiment of an upper tool of the punch-handling tool.

In FIG. 6, an alternative embodiment of an upper tool 21 of the tool 20 is shown as a punch-handling tool.

Figure 7:
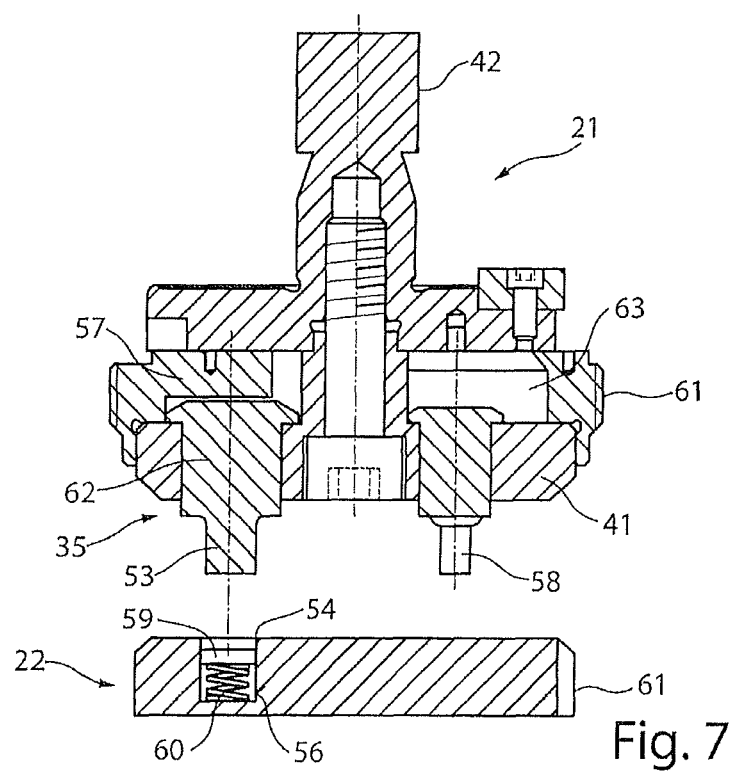
FIG. 7 depicts a schematic full section of the upper tool according to FIG. 6.

In FIG. 7, a full section of the upper tool 21 according to FIG. 6 is depicted. In addition, an exemplary lower tool 22 is also depicted in full section. The upper tool 21 comprises a punching stamp 35 that is formed, for example, by means of two individual stamps 58, and a clinch tool 37, which is formed as a cylindrical clinch tool 53, for example. The punching stamp 35 and the clinch tool 37 are received in the tool base body 41. This tool base body 41 comprises a control disk 57 having an external gearing 61, whereby the control disk 57 is rotatable in its position relative to the tool base body 41. Above the control disk 57, the clamping pin 42 is provided. The punching stamp 35 and the clinch tool 37 are received in the workpiece base body 41 to be longitudinally moveable. To do so, the punching stamp 35 and the clinch tool 37 both have a guiding body 62, the control disk 57 abutting on the internal end thereof. For example, the punching stamp 35 is thus activated and cannot be retracted into the free space 63 during a power stroke, whereas the clinch tool 37 is inactivated and can retract in the tool base body 41 because of the remaining free space 63.

The lower tool 22 depicted in sections has a counter cut 54 that borders an indent. An ejector 59 is moveably received in the indent 56 by means of a spring element 60 in the indent 56. Furthermore, in each case, punching stamp receivers are provided in the lower tool 22, said punching stamp receivers lying in front of and behind a sectional plane and therefore not being depicted. This lower tool 22 can also be rotatably controlled via an external gearing 61 so that the lower tool 22 and the upper tool 21 are aligned appropriately relative to each other. A multi-tool upper tool and lower tool is thus provided.

When handling a first workpiece part 49, which extends flatly in such a way that this can no longer be received by the punching stamp 35 in a receiver 44, such an upper tool 21 according to FIGS. 5 and 6 is used. From this, the following process emerges:

In the embodiment of the upper tool 21, it is provided, for example, that a clinch stamp 53 and a punching stamp 35 formed from two individual stamps 58 are provided. The clinch stamp 53 and the individual stamps 58 lie on a common partial circle.

Figure 8:
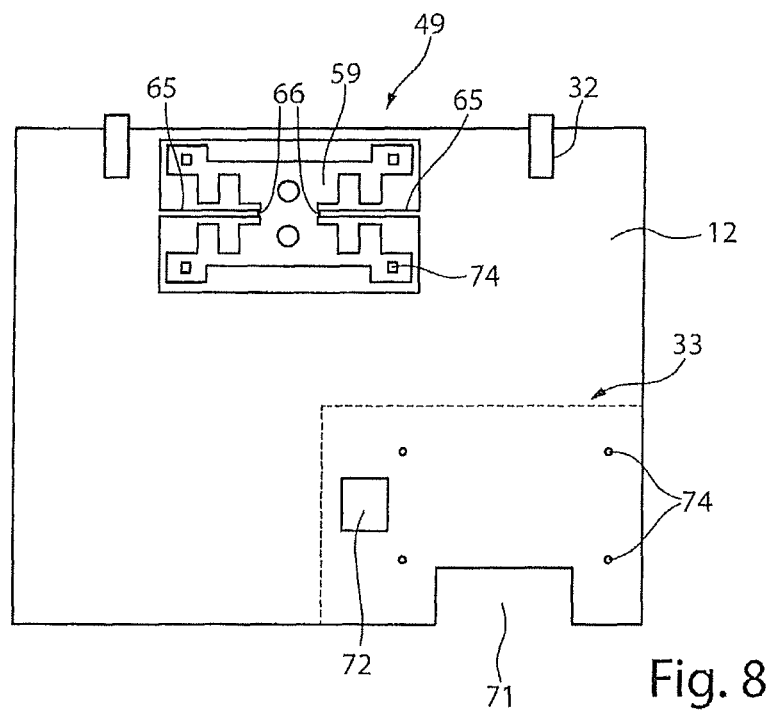
FIG. 8 depicts a schematic view from above of a plate-shaped material after the production of a first workpiece part.

A top view of the plate-shaped material 12 is depicted, for example, in FIG. 8, said material 12 being held by the gripping device 32. By means of a punching or laser process, the first workpiece part 49 is introduced in the plate-shaped material 12, wherein the first workpiece part 49 is fixedly connected to the plate-shaped material 12 by means of connection rods 65. To cut the first workpiece 49 free, the punching stamp 35 is activated. Then, the two individual stamps 58 of the punching stamp 35 are moved towards the first workpiece part 49, wherein the multi-tool/punching die 36 is already positioned below the first workpiece part 49. The individual stamps 58 cut the circular contour 66 and, at the same time, separate the first workpiece part 49 from the connection rods 65. The clinch tool 37 is inactive such that this can retract into the tool base body 41.

After cutting the first workpiece part 49 free from the connection rods 65 or after introducing the separating cut, the first workpiece part 49 remains on the punching stamp 35 because of clamping or wedging the two circular contours 66 with the individual stamps 58, such that this can subsequently be raised from the processing plane and positioned relative to the second workpiece part 33. The second workpiece part 33 can be introduced in the same plate-shaped material 12, according to this exemplary embodiment, out of which material 12 the first workpiece part 49 is produced. The second workpiece part 33 can comprise, for example, at least one indent 71 and/or, secondly, an aperture 72. This is only by way of example.

Figure 9:
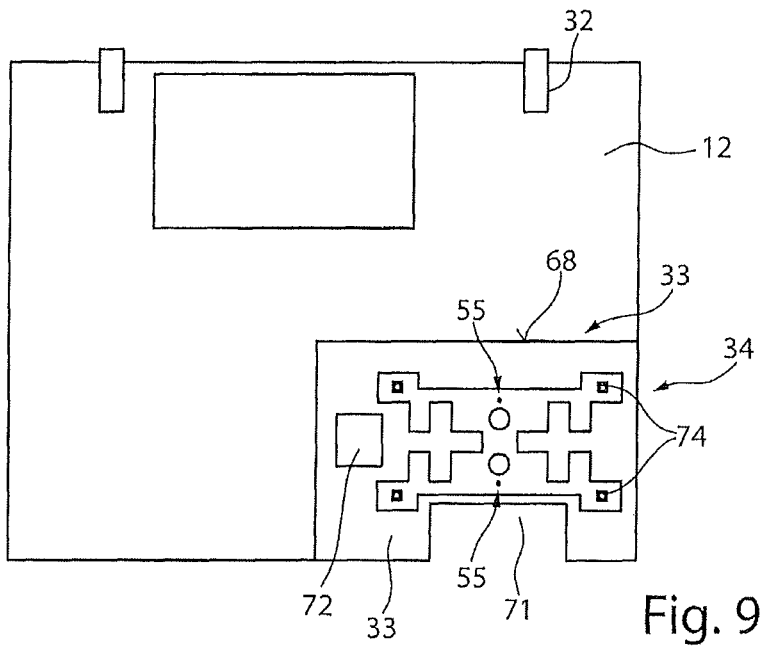
FIG. 9 depicts a schematic view from above of a strengthened workpiece before separation from a plate-shaped material.

Before or during placing the first workpiece part 49 on the second workpiece part 33, the control disk 57 is activated such that the punching stamp 35 with the two individual stamps 58 is inactivated and the clinch tool 37 is activated. Subsequently, at least one connection point 55 can be directly introduced to obtain a prefixing of the first workpiece part 49 to the second workpiece part 33. This can take place on the tool base body 41 of the upper tool 21 to the left or right depending on the alignment of the clinch tool 37 relative to the punching tool 35, wherein, in FIG. 9, the two possibilities are depicted. After positioning the first workpiece part 49 on the second workpiece part 33, these are connected to each other by means of the clinch tool 37. Until this method step, the workpiece 49 remains held in a clamped or tensioned manner by the upper tool 21. In a subsequent processing step that is not depicted in more detail, an external contour 68 of the second workpiece part 33 can then be cut out and the strengthened workpiece 34 led away from the machine table 25.

Alternatively and not depicted in more detail, two or more first workpiece parts 49 can be arranged lying one on top of the other having the same contour or one that deviates from the other on the plate-shaped material 12 for forming the strengthened workpiece 34 and can be connected to one another. Here, both the plate-shaped material 12 and the at least one first workpiece part 49 can have a profiling, contouring, ribbed structure or similar and, nevertheless, can be fixedly connected to one another on individual connection points.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A punch-handling tool for the production of a workpiece from a plate-shaped material, the punch handling tool comprising:
    an upper tool having at least one punching stamp; and
    a lower tool having at least one punching die;
    wherein at least one of the punching stamps comprises an indent or recess configured to receive an external contour of a first workpiece part and to hold the first workpiece part in at least one of a clamped manner and a tensioned manner, or
    wherein at least one of the punching stamps is configured to abut an internal contour of a recess in a first workpiece part and to hold the first workpiece part in at least one of a clamped manner or a wedged manner.

2. The punch-handling tool of claim 1, wherein the at least one of the punching stamps is configured to receive an external contour of the first workpiece part and to hold the first workpiece part in at least one of the clamped manner and the tensioned manner.

3. The punch-handling tool of claim 1, wherein the upper tool has a punching stamp having a receiver for the first workpiece part and the lower tool has both a punching die having a pressure surface for transferring the first workpiece part into the receiver of the punching stamp and has a clinch tool that connects the first workpiece part and a second workpiece part to the punching stamp to form a strengthened workpiece.

4. The punch-handling tool of claim 1, wherein the upper tool has at least one punching stamp and at least one clinch tool in a tool base body that is moveably received by a guiding body relative to the tool base body and a punching stamp configured to be activated for introducing a separating cut of the at least one punching stamp such that the punching stamp is held in a non-moveable manner relative to the tool base body during a power stroke, and the clinch tool is retractable into the tool base body during a power stroke thereby being inactivated, whereby the punching stamp is inactivated for connecting the first workpiece part to the second workpiece part without filler material and the clinch tool is activated relative to the tool base body.

5. The punch-handling tool of claim 1, wherein the punching stamp has a peripheral wall abutting on a punching surface, which peripheral wall tapers relative to the punching surface.

6. The punch-handling tool of claim 3, wherein the clinch tool is formed to be shorter in length than the at least one punching stamp.

7. The punch-handling tool of claim 1, wherein at least one of the punching stamps is configured to abut an internal contour of a recess in the first workpiece part and to hold the first workpiece part in at least one of the clamped manner or the wedged manner.

* * * * *